United States Patent
Kaplow

(10) Patent No.: US 12,425,855 B2
(45) Date of Patent: Sep. 23, 2025

(54) PERFORMING IMAGING OPERATIONS VIA A DIRECT SECURE WIRELESS CONNECTION TO AN IMAGING DEVICE

(71) Applicant: MICROSOFT TECHNOLOGY LICENSING, LLC, Redmond, WA (US)

(72) Inventor: Jacob Henry Kaplow, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 393 days.

(21) Appl. No.: 18/116,822

(22) Filed: Mar. 2, 2023

(65) Prior Publication Data

US 2024/0298177 A1  Sep. 5, 2024

(51) Int. Cl.
| | | |
|---|---|---|
| G06F 7/04 | (2006.01) | |
| H04W 12/033 | (2021.01) | |
| H04W 12/069 | (2021.01) | |
| H04W 12/08 | (2021.01) | |
| H04W 12/69 | (2021.01) | |

(52) U.S. Cl.
CPC ....... *H04W 12/069* (2021.01); *H04W 12/033* (2021.01); *H04W 12/08* (2013.01); *H04W 12/69* (2021.01)

(58) Field of Classification Search
CPC ....... H04L 9/0816; H04L 63/10; H04L 63/18; G06F 21/33; G06F 21/35; G06F 21/43; G06F 21/608; H04W 12/069; H04W 12/69; H04W 12/033; H04W 12/08
See application file for complete search history.

(56) References Cited

U.S. PATENT DOCUMENTS

| | | |
|---|---|---|
| 9,230,125 B2 | 1/2016 | Inoue |
| 10,742,831 B1 | 8/2020 | Haapanen |
| 11,425,767 B2 | 8/2022 | Foster et al. |
| 2007/0242729 A1 | 10/2007 | Quinn et al. |

(Continued)

OTHER PUBLICATIONS

Torrellas et al, An Authentication Protocol for Agent Platform Security Manager, Sep. 19, 2003, IEEE, pp. 623-628. (Year: 2003).*

(Continued)

*Primary Examiner* — Philip J Chea
*Assistant Examiner* — Jenise E Jackson
(74) *Attorney, Agent, or Firm* — Newport IP, LLC; Jacob P. Rohwer

(57) ABSTRACT

Technologies are disclosed for performing imaging operations via a direct secure wireless connection to an imaging device. An imaging device, such as a printer or scanner, obtains a signed certificate defining a security policy from an identity and access management ("IAM") service. A computing device, such as a laptop or smartphone, obtains a signed certificate from the IAM service that defines access rights associated with the computing device. The imaging device and the computing device exchange the signed certificates. The imaging device approves or denies a request from the computing device to perform imaging operations by way of a direct secure wireless communication channel between the imaging device and the computing device based on the security policy and the access rights.

20 Claims, 12 Drawing Sheets

(56) References Cited

U.S. PATENT DOCUMENTS

| | | |
|---|---|---|
| 2011/0075186 A1 | 3/2011 | Azuma |
| 2013/0057895 A1 | 3/2013 | Okazawa |
| 2013/0061041 A1* | 3/2013 | Inoue .................... G06F 21/608 |
| | | 713/156 |
| 2013/0067543 A1* | 3/2013 | Takeda .................... G06F 21/33 |
| | | 726/4 |
| 2013/0141747 A1 | 6/2013 | Oba et al. |
| 2013/0201515 A1 | 8/2013 | Daos et al. |
| 2014/0240753 A1* | 8/2014 | Anno .................... G06F 3/1243 |
| | | 358/1.15 |
| 2018/0278607 A1 | 9/2018 | Loladia |
| 2020/0267006 A1* | 8/2020 | Nyman ................. H04L 63/062 |
| 2022/0095108 A1* | 3/2022 | Siedow ............... H04W 12/009 |

OTHER PUBLICATIONS

Markopoulos et al, Security Mechanisms Maintaining User Profile in a Personal Area Network, Sep. 10, 2003, pp. 2770-2774. (Year: 2003).*

International Search Report and Written Opinion received for PCT Application No. PCT/US2024/017191 May 31, 2024, 15 pages.

"Universal Print", Retrieved From: https://web.archive.org/web/20221117033107/https://www.microsoft.com/en-us/microsoft-365/windows/universal-print, Retrieved Date: Nov. 17, 2022, 7 Pages.

* cited by examiner

PROVISIONING OF IMAGING DEVICE

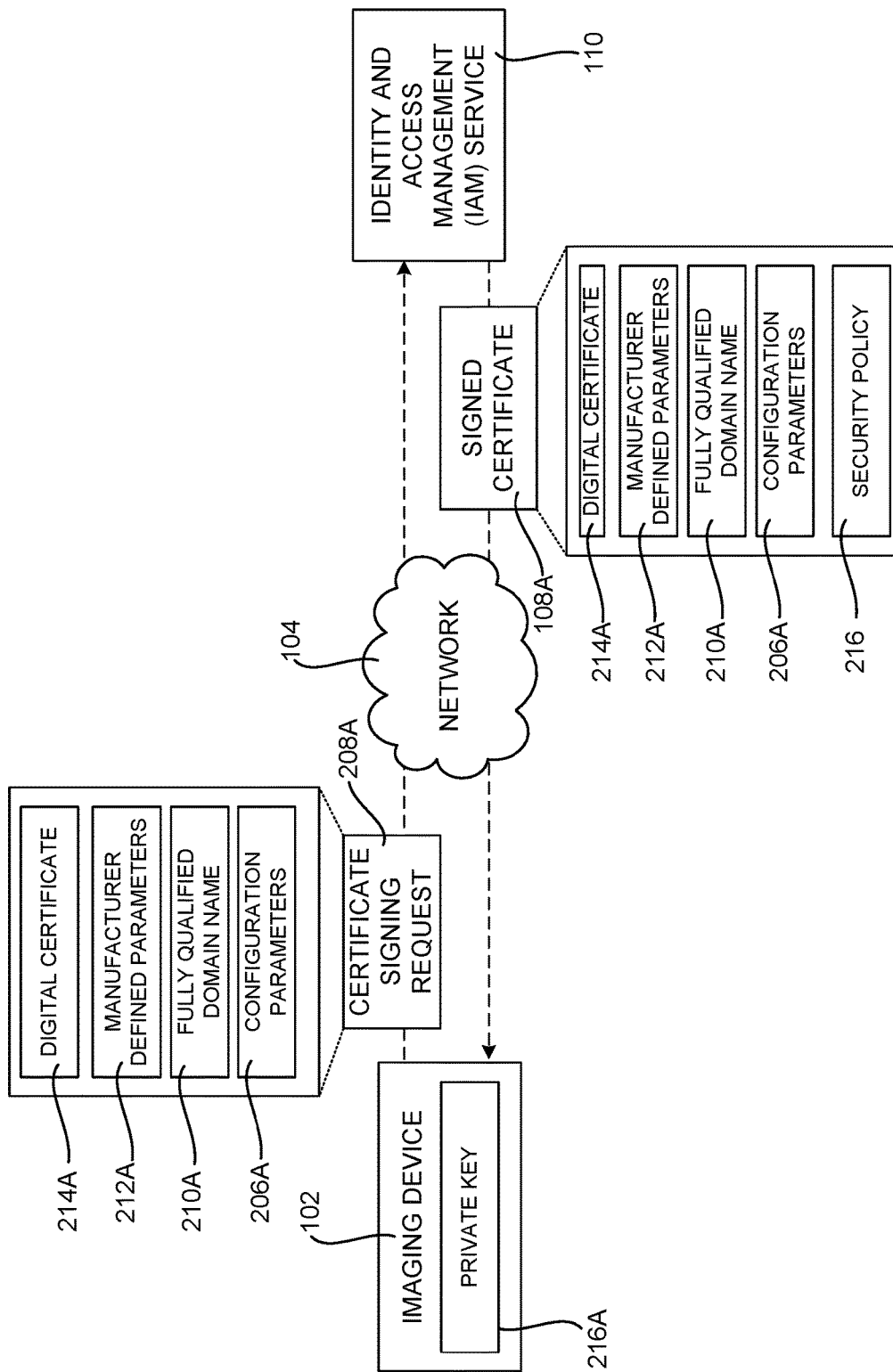

PROVISIONING OF COMPUTING DEVICE

RETRIEVE SIGNED CERTIFICATE FOR COMPUTING DEVICE FROM AUTHENTICATION SERVICE

PERFORMING IMAGING OPERATIONS VIA A DIRECT SECURE WIRELESS CONNECTION TO AN IMAGING DEVICE

BACKGROUND

It is desirable for printing, scanning, and other types of imaging operations to be performed in a highly secure manner in certain types of environments, such as corporate environments. In order to securely perform these operations, imaging devices, such as printers and scanners, and computing devices that utilize the services provided by imaging devices, commonly authenticate with a remote authentication service. Authentication in this way is utilized to enforce user-defined policies that specify the permitted connections between imaging devices and other computing devices, limitations on the usage of imaging devices, and others. These types of configurations also enable usage monitoring, reporting, and other types of imaging management functionality that is commonly important in environments having many imaging devices and complex networks.

In secure imaging environments such as those described above, it is also common for documents upon which imaging operations are to be performed to be transferred over the internet twice. For instance, when a document is printed in such an environment, the document is first transmitted over the internet to a print server or another type of service where the document is processed. The processed document is then transmitted over the internet again to the destination imaging device, where the requested imaging operation is performed.

Transmitting documents over the internet twice per imaging operation is inefficient at best, and can be problematic when the internet connection is slow or unreliable. Additionally, it might not be possible to perform a requested imaging operation if a connection to the internet is not available. While mechanisms exist for performing imaging operations by directly communicating with a local imaging device, these mechanisms are unable to provide meaningful security, enforce policies, or provide the imaging management functionality described above.

SUMMARY

Technologies are disclosed herein for performing imaging operations via a direct secure wireless connection to an imaging device. Through implementations of the disclosed technologies, printing, scanning, and other types of imaging operations are performed in a secure manner, even when an imaging device, or a computing device configured to utilize the services of an imaging device, cannot connect to the internet to authenticate with a remote authentication service.

Implementations of the disclosed technologies also do not require that documents be transmitted twice when performing imaging operations, thereby saving network bandwidth. Additionally, implementations of the disclosed technologies provide these benefits, and potentially others, while retaining the ability to enforce user-defined policies and provide usage monitoring, reporting, and other types of imaging management functionality. Other technical benefits not specifically mentioned herein might also be realized through implementations of the disclosed subject matter.

In order to provide aspects of the functionality disclosed herein, an imaging device, such as a printer, scanner, copier, fax, or multi-function device, is configured for operation with an identity and access management ("IAM") service. The IAM service is a network-accessible service that provides functionality for authenticating and authorizing users and devices, defining and enforcing policies, and providing functionality for signing digital certificates. The IAM service may also provide other types of functionality.

In an embodiment, the imaging device generates or is provisioned with a digital certificate containing a public key associated with the imaging device. The imaging device generates a request to the IAM service to sign the digital certificate. In turn, the IAM service signs the digital certificate with its own private key to generate a signed certificate. In an embodiment, the IAM service also adds data defining a security policy to the signed certificate.

The security policy defines the computing devices that are authorized to utilize functionality provided by the imaging device (e.g., printing or scanning), the users that are authorized to utilize the functionality provided by the imaging device, limitations on usage of the functionality provided by the imaging device, and potentially other types of policies. The imaging device stores the signed certificate received from the IAM service in a memory.

A computing device, such as a laptop computer or smartphone, is configured to utilize the imaging functionality provided by the imaging device. The computing device is also configured for operation with the IAM service. In order to enable aspects of this functionality, the computing device generates or is provisioned with a digital certificate containing a public key associated with the computing device. The computing device generates a certificate signing request to the IAM service. In response thereto, the IAM service returns a signed certificate that includes the public key associated with the computing device.

In an embodiment, the signed certificate returned to the computing device also includes data defining access rights for accessing the imaging functionality provided by the imaging device. The access rights specify that the computing device or a user of the computing device is authorized to utilize the imaging functionality provided by the imaging device. For instance, in an embodiment, the access rights indicate membership in a security group for the computing device or a user of the computing device. The access rights specify other types of rights such as, for example, limitations on usage of the functionality provided by the imaging device or other types of restrictions on the use of the imaging device, in other embodiments.

In an embodiment, the imaging device advertises its availability by way of a wireless communication channel. For example, in an embodiment, the imaging device advertises its availability via a BLUETOOTH® wireless communication channel. In another embodiment, the imaging device advertises its availability via an ultra-wideband ("UWB") wireless communication channel. The imaging device advertises its availability via other types of wireless communication channels, in other embodiments.

In response to the advertisement of availability presented by the imaging device, a computing device such as is described above requests to utilize aspects of the imaging functionality provided by the imaging device, in an embodiment. In response to such a request, the imaging device and the computing device exchange the signed certificates received from the IAM service, respectively. In an embodiment, the certificate exchange is performed over a direct secure wireless communication channel. The direct secure wireless connection is a direct UWB connection between the imaging device and the computing device, in an embodiment.

The imaging device authenticates the signed certificate received from the computing device. If the signed certificate is authenticated, the imaging device utilizes the security policy in its signed certificate and the access rights in the signed certificate received from the computing device to determine whether to authorize the computing device to utilize the functionality that it provides. For example, the imaging device determines if the security policy indicates that a user or computing device identified by the access rights is authorized to use the functionality that it provides, in an embodiment.

The imaging device then permits or denies the computing device use of the requested imaging functionality by way of the direct secure wireless communication channel based on the determination. For instance, if the imaging device permits the computing device to use aspects of its functionality for printing, the computing device transmits a document to the imaging device for printing by way of the direct secure wireless communication channel (e.g., UWB communication channel).

The above-described subject matter is implemented as a computer-controlled apparatus, a computer-implemented method, a processing system, or as an article of manufacture such as a computer readable medium in various embodiments disclosed herein. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2B is a network architecture diagram showing additional aspects of the mechanism shown in FIGS. 1A-1C and 2A for obtaining a signed certificate for an imaging device from an IAM service, according to embodiments:

DETAILED DESCRIPTION

Figure 1A:
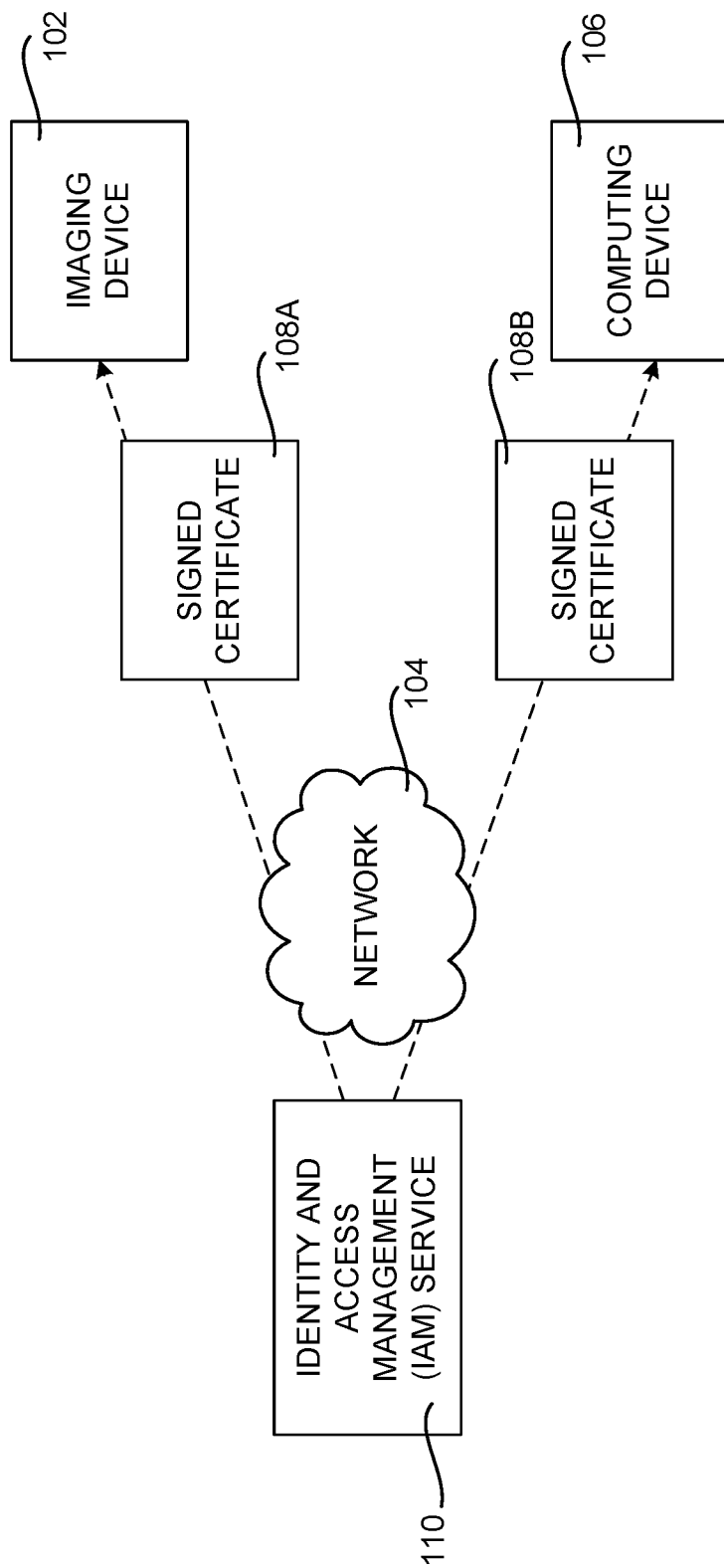
FIG. 1A is a network architecture diagram showing aspects of an example mechanism disclosed herein for obtaining signed certificates for an imaging device and a computing device from an IAM service.

The following detailed description is directed to technologies for performing imaging operations via a direct secure wireless connection to an imaging device. As discussed briefly above, printing, scanning, and other types of imaging operations commonly need to be performed in a secure manner. For example, it might be desirable, or even necessary, for imaging operations to be performed securely in corporate, government, and other types of secure environments.

In order to securely perform imaging operations, imaging devices, such as printers and scanners, and computing devices that utilize the functionality provided by imaging devices, commonly authenticate with a remote authentication service. Authentication in this manner is utilized to enforce user-defined policies that specify the permitted connections between imaging devices and other devices, limitations on the usage of imaging devices, and other policies. These types of configurations also enable usage monitoring, reporting, and other types of imaging management functionality that is commonly important in environments having many imaging devices and complex networks.

In secure imaging environments such as those described above, it is also common for documents upon which imaging operations are to be performed to be transferred over the internet twice. For instance, when a document is printed in such an environment, the document is first transmitted over the internet to a print server or another type of service where the document is processed. The processed document is then transmitted over the internet again to the destination imaging device.

Transmitting documents twice per imaging operation is inefficient at best, and can be problematic when the internet connection is slow or unreliable. If a connection to the internet is unavailable, it might not be possible to perform the requested imaging operation. While mechanisms exist for performing imaging operations by directly communicating with an imaging device, these mechanisms are unable to enforce policies or provide the benefits of print management described above.

As will be discussed in greater detail below with respect to FIGS. 1A-5, technologies are disclosed herein for performing imaging operations via a direct secure wireless connection to an imaging device. In particular, an imaging device, such as a printer or scanner, obtains a signed certificate defining a security policy from an IAM service. A computing device, such as a laptop or smartphone, obtains a signed certificate from the IAM service that defines access rights associated with the computing device.

The imaging device and the computing device exchange the signed certificates. The imaging device approves or denies a request from the computing device to perform imaging operations by way of a direct secure wireless communication channel based on the security policy and the access rights. Because the imaging device determines the access rights of the computing device locally at the time a request is made, no active network connection to the IAM service is required at the time the request is made.

Moreover, because the signed certificate obtained by the imaging device includes a security policy, the imaging device provides functionality for implementing the security policy without contacting the IAM service at the time a request is made. Additionally, the computing device utilizes the imaging functionality provided by the imaging device over the direct secure wireless communication channel, thereby eliminating the need to transfer documents over the internet twice in previous solutions. Additional details regarding these aspects will be provided below with regard to FIGS. 1A-5.

FIG. 1A is a network architecture diagram showing an overview of an example mechanism disclosed herein for obtaining signed certificates 108A and 108B, respectively, for an imaging device 102 and a computing device 106 from an IAM service 110. The imaging device 102 is a device capable of performing imaging operations, such as printing, copying, scanning, and faxing.

The imaging device 102 is a single function device, such as a printer that does not provide scanning or fax functionality, in an embodiment. In another embodiment, the imaging device 102 is a multi-function device capable of performing multiple types of imaging operations, such as a device capable of printing, copying, scanning, and sending and receiving faxes.

The computing device 106 is a device configured to utilize some or all of the imaging functionality provided by the imaging device 102. For instance, the computing device 106 is a laptop computer, a desktop computer, or a smartphone, in various embodiments.

The imaging device 102 and the computing device 106 are configured for operation with the IAM service 110. The IAM service 110 is a service accessible via a network 104, such as the internet, that provides functionality for authenticating and authorizing users and devices. The IAM service 110 also provides functionality for centrally defining and enforcing policies and functionality for signing digital certificates. The IAM service 110 provides additional types of functionality in some embodiments. Details regarding the functionality provided by the IAM service 110 will be described below.

The imaging device 102 generates or is provisioned with a digital certificate containing a public key associated with the imaging device 102. The imaging device 102 generates a request to the IAM service 110 to sign the digital certificate. In turn, the IAM service 110 signs the digital certificate with its own private key to generate a signed certificate 108A and returns the signed certificate 108A to the imaging device 102.

The IAM service 110 also adds data defining a security policy to the signed certificate 108A. The security policy is data that defines the computing devices, such as the computing device 106, that are authorized to utilize the imaging functionality (e.g., printing or scanning) provided by the imaging device 102. The security policy also defines the users that are authorized to utilize the imaging functionality provided by the imaging device 102, in embodiments. A user of the IAM service 110 with administrative rights defines the security policy, in embodiments.

The security policy specifies limitations (e.g., restrictions on the number of pages that can be printed or scanned) on usage of the imaging functionality provided by the imaging device 102, in embodiments. In some embodiments, the security policy defines other types of policies. The imaging device 102 stores the signed certificate 108A received from the IAM service 110 in a memory.

Additional details regarding an example provisioning method for the imaging device 102 will be provided below with respect to FIG. 2A. Additional details regarding an example process by which the imaging device 102 obtains a signed certificate 108A from the IAM service 110 will be provided below with regard to FIG. 2B.

As discussed briefly above, a computing device 106, such as a laptop or desktop computer, or smartphone, is also configured to utilize the imaging functionality provided by the imaging device 102. For example, the computing device 106 is configured to utilize printing, scanning, and/or other types of functionality provided by the imaging device 102, according to embodiments.

The computing device 106 is also configured for operation with the IAM service 110. In particular, the computing device 106 is provisioned with or generates a digital certificate containing a public key associated with the computing device 106. The computing device 106 generates a certificate signing request to the IAM service 110.

In response to receiving the certificate signing request from the computing device 106, the IAM service 110 generates and returns a signed certificate 108B that includes the public key associated with the computing device 106. In embodiments, the signed certificate 108B returned to the computing device 106 also includes data defining access rights for accessing the imaging functionality provided by the imaging device 102. The access rights specified by the signed certificate 108B in this embodiment indicate that the computing device 106, or a user of the computing device 106, is authorized to utilize the imaging functionality provided by the imaging device 102. For example, in some embodiments, the access rights indicate membership in a security group for the computing device or a user of the computing device. The access rights also specify other types of rights such as, for example, limitations on usage of the functionality provided by the imaging device 102, in embodiments. The access rights in the signed certificate 108B define other types of restrictions on the use of the imaging device 102, in some embodiments.

Additional details regarding the provisioning of the computing device 106 will be provided below with respect to FIG. 2C. Additional details regarding an illustrative process by which the computing device 106 obtains a signed certificate 108B will be provided below with regard to FIG. 2D.

Figure 1B:
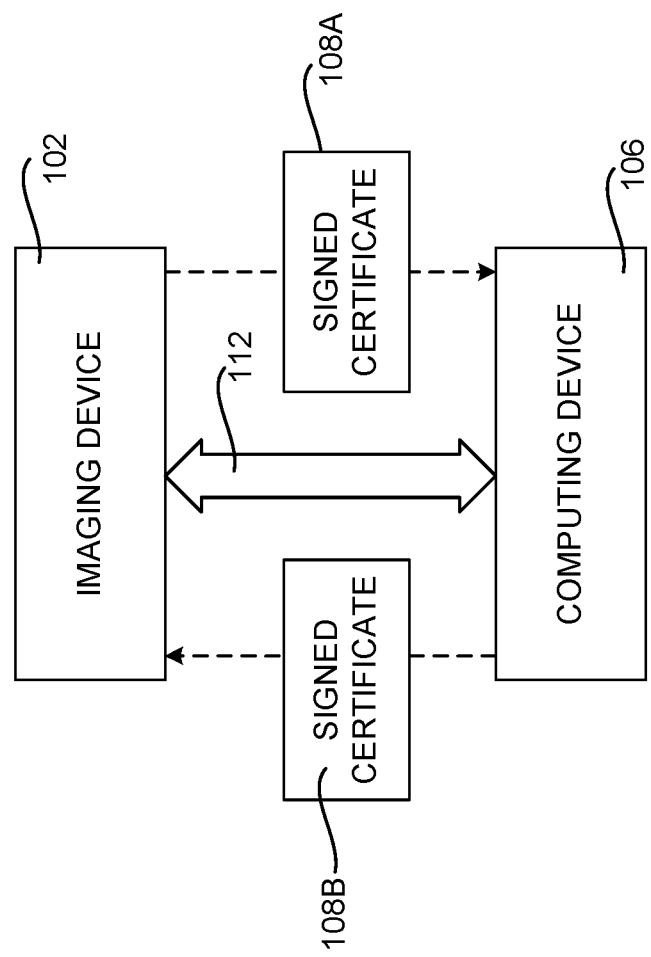
FIG. 1B is a network architecture diagram showing aspects of an example mechanism disclosed herein for performing a certificate exchange between an imaging device and a computing device and enabling imaging operations via a direct secure wireless connection to an imaging device based on the certificate exchange.

FIG. 1B is a network architecture diagram showing an overview of an example mechanism disclosed herein for performing a certificate exchange between an imaging device 102 and a computing device 106, and enabling imaging operations via a direct secure wireless connection 112 to the imaging device 102 based on the certificate exchange. In the embodiment shown in FIG. 1B, the imaging device 102 advertises its availability to computing devices, such as the computing device 106, by way of a wireless communication channel. Other mechanisms by which the computing device 106 discovers the imaging device 102 are utilized in other embodiments.

In embodiments, the imaging device 102 advertises its availability via a BLUETOOTH® wireless communication channel. In other embodiments, the imaging device 102 advertises its availability via a UWB wireless communication channel. As discussed briefly above, a UWB wireless communication channel is a very low energy level, short-range, high-bandwidth communication channel that utilizes a large portion of the radio spectrum. BLUETOOTH® and WI-FIR communication channels are not UWB wireless communication channels.

Once the computing device 106 has discovered the imaging device 102 using any suitable mechanism (e.g., the mechanisms described above), the computing device 106 requests to utilize aspects of the imaging functionality provided by the imaging device 102. For example, the computing device 106 requests to utilize printing or scanning functionality provided by the imaging device 102, in embodiments.

In response to such a request, the imaging device 102 and the computing device 106 exchange the signed certificates 108A and 108B obtained from the IAM service 110, respectively. The certificate exchange is performed over a direct secure wireless communication channel 112, in embodiments. As discussed above, the direct secure wireless connection 112 is a UWB communication channel between the imaging device 102 and the computing device 106, in some embodiments.

In other embodiments, the certificate exchange described above is performed during establishment of the direct secure wireless communication channel 112. For instance, the certificate exchange is performed over a UWB communication channel during establishment of the UWB communication channel, in embodiments. For example, the certificate exchange is performed as a part of a session establishment protocol for setting up the UWB communication channel, in embodiments.

In other embodiments, the certificate exchange is performed prior to establishment of the direct secure wireless communication channel 112. For instance, the certificate exchange is performed over a BLUETOOTH® or WI-FIR communication channel prior to establishing a UWB communication channel between the imaging device 102 and the computing device 106, in an embodiment. In this embodiment, imaging operations can be performed via the UWB communication channel once established.

The imaging device 102 utilizes the security policy in the signed certificate 108A and the access rights specified by the signed certificate 108B received from the computing device 106 to determine whether to authorize the computing device 106 to utilize the requested imaging functionality by way of the direct secure wireless communication channel 112. For example, the imaging device 102 determines if the security policy indicates that a user or a computing device identified by the access rights in the signed certificate 108B is authorized to use the functionality that it provides, in embodiments.

The imaging device 102 then permits or denies the computing device 106 the ability to utilize the requested imaging functionality by way of the direct secure wireless communication channel 112 based on the determination, in embodiments. For instance, if the imaging device 102 permits the computing device 106 to use aspects of its functionality for printing, the computing device 106 transmits a document to the imaging device 102 for printing by way of the direct secure wireless communication channel 112 (e.g., UWB communication channel), in some embodiments.

The imaging device 102 and the computing device 106 obtain and store their signed certificates 108A and 108B from the IAM service 110, respectively, when a network connection to the IAM service 110 is available. In embodiments, the certificate exchange performed between the imaging device 102 and the computing device 106 takes place when a network connection from the imaging device 102 or the computing device 106 to the IAM service 110 is unavailable or not in use (e.g., if the computing device 106 is connected to an untrusted network).

Figure 1C:
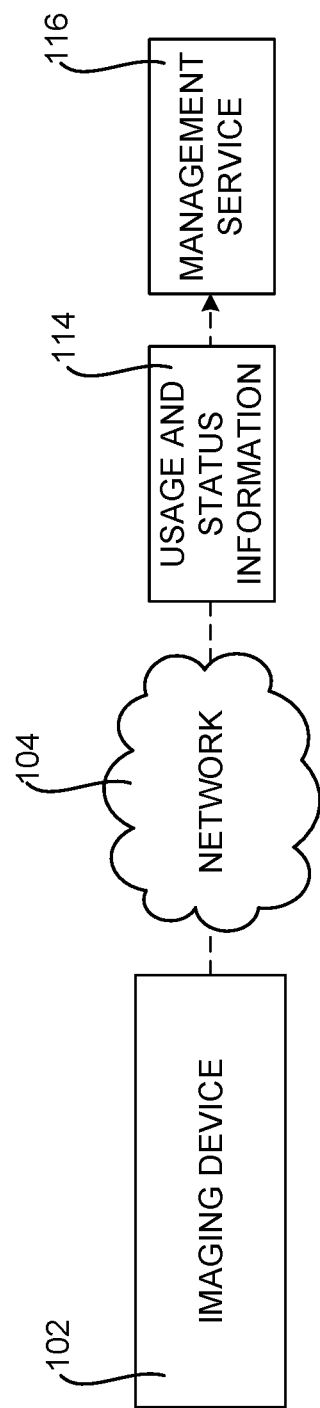
FIG. 1C is a network architecture diagram showing aspects of an example mechanism disclosed herein for periodically reporting usage and status information from an imaging device to a management service.

FIG. 1C is a network architecture diagram showing aspects of an example mechanism disclosed herein for periodically reporting usage and status information from an imaging device 102 to a management service 116. As discussed briefly above, the imaging device 102 and the computing device 106 utilize the disclosed functionality for performing imaging operations over the direct secure wireless communication channel 112, for example, when the imaging device 102 or the computing device 106 do not have an active network connection (e.g., a network connection is not available or it is undesirable to establish a network connection on an insecure network). In such cases, because the imaging device 102 does not have an active a network connection, it cannot provide information describing aspects of its operation to a management service 116.

In such embodiments, the imaging device 102 collects and locally stores usage and status information 114 while a connection to the management service 116 is not active. The usage and status information 114 includes data describing usage of the imaging device 102. For example, the imaging device 102 stores data identifying the users of the imaging device 102, the number of pages printed, scanned, or faxed by each user, and the date and time of usage, in embodiments.

The usage and status information 114 also includes data describing the status of the imaging device 102. For example, the imaging device 102 stores data describing the number of pages it has printed, the status of expendable supplies such as paper, toner, or ink, the status of any encountered errors, and other information describing the status of the imaging device 102, in embodiments.

The imaging device 102 can determine when a connection to a management service 116 is available via a network 104, such as the internet. When a connection to the management service 116 becomes available, the imaging device 102 transmits the usage and status information 114 to the management service 116. Thereafter, the management service 116 utilizes the usage and status information 114 to bill users or other entities for their actual use of the imaging device 102, to schedule replacement of consumables (e.g., paper, toner, or ink) or maintenance of the imaging device 102, and potentially other types of imaging management functionality, according to embodiments. Additional details regarding the embodiments described briefly above with regard to FIGS. 1A-IC will now be provided with regard to FIGS. 2A-2E.

Figure 2A:
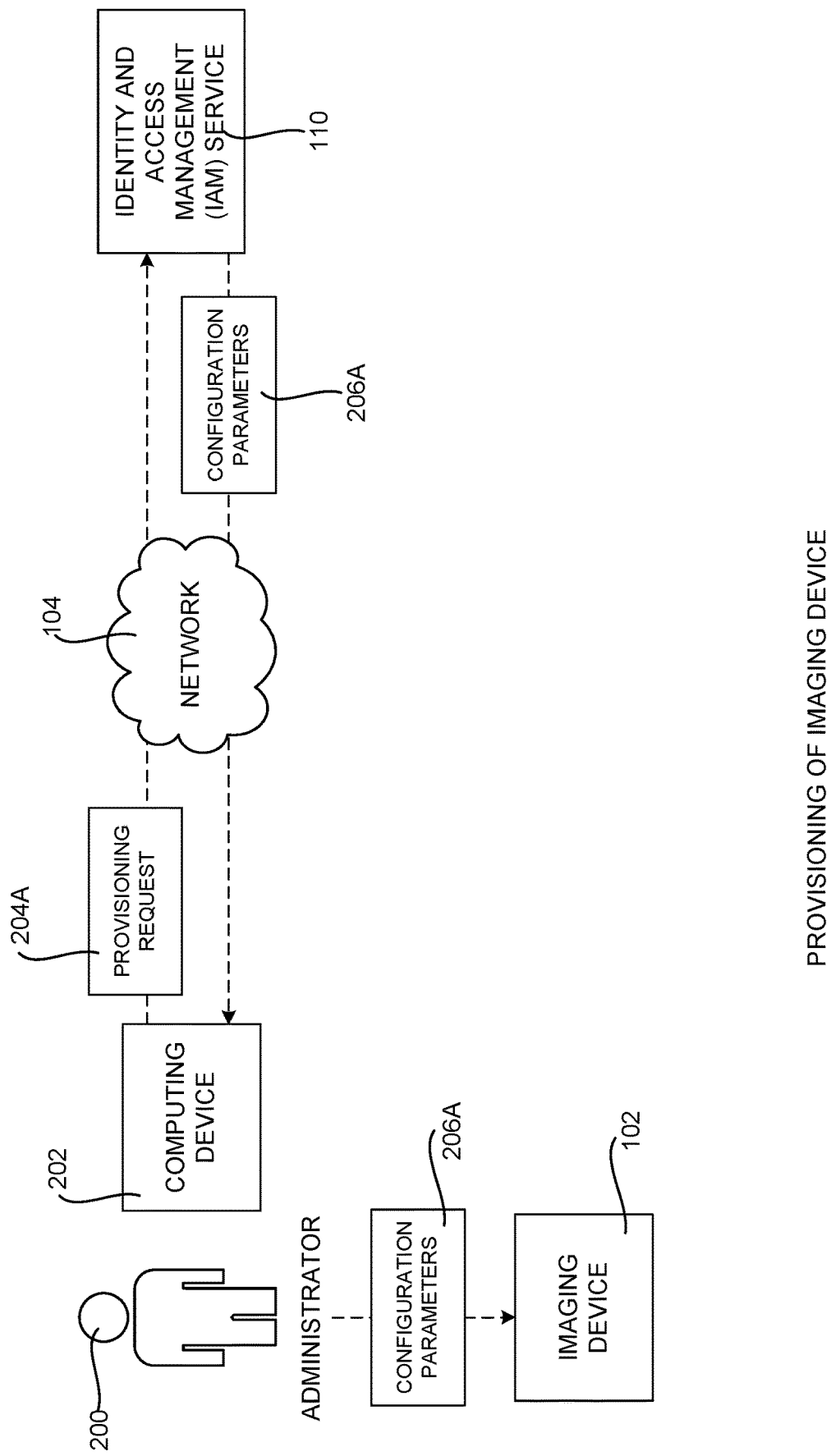
FIG. 2A is a network architecture diagram showing additional aspects of the mechanism shown in FIGS. 1A-1C for configuring an imaging device for communication with an IAM service, according to embodiments.

FIG. 2A is a network architecture diagram showing additional aspects of the mechanism shown in FIG. 1A for configuring an imaging device 102 for communication with the IAM service 110. In the embodiment shown in FIG. 2A, a user 200, such as a user of the IAM service 110 with administrative privileges, utilizes a computing device 202 to establish a connection with the IAM service 110 over a suitable network 104, such as the internet. The user 200 utilizes the computing device 202 and an interface (e.g., a web-based interface) provided by the IAM service 110 to submit a provisioning request 204A to the IAM service 110.

The provisioning request 204A is a request to provision the imaging device 102, or a user of the imaging device 102, for use with the IAM service 110. The provisioning request 204A includes data identifying the imaging device 102, in embodiments. The provisioning request 204A includes other types of data for use by the IAM service 110 when provisioning the imaging device 102 in some embodiments.

Responsive to the provisioning request 204A, the IAM service 110 enables the imaging device 102 to utilize aspects of the functionality provided by the IAM service 110. In embodiments, the IAM service 110 also returns configuration parameters 206A to the computing device 202 in response to the provisioning request 204A. The configuration parameters 206A include values for various parameters supported by the imaging device 102. For instance, the configuration parameters 206A specify encryption algorithms supported by the IAM service 110, in embodiments.

The configuration parameters 206A include values for settings that enable the imaging device 102 to connect to the IAM service 110, in some embodiments. In some embodiments, the configuration parameters 206A include values for other settings that enable the imaging device 102 to interoperate with the IAM service 110.

In embodiments, the user 200 manually applies the configuration parameters 206A to the imaging device 102. For instance, the user 200 utilizes a menu provided by the imaging device 102 to configure the imaging device 102 with the configuration parameters 206A provided by the IAM service 110.

In other embodiments, the imaging device 102 retrieves the configuration parameters 206A from the IAM service 110 over the network 104. The imaging device 102 is configured for communication with the IAM service 110 following application of the configuration parameters 206A.

FIG. 2B is a network architecture diagram showing additional aspects of the mechanism shown in FIGS. 1A and 2A and described above for obtaining a signed certificate 108A for an imaging device 102 from the IAM service 110, in embodiments. Once the imaging device 102 has been provisioned in the IAM service 110 and configured for communication with the IAM service 110 in the manner described above with regard to FIG. 2A, the imaging device 102 transmits a certificate signing request 208A to the IAM service 110.

As described briefly above, the imaging device 102 generates or is provisioned with a digital certificate 214A containing a public key associated with the imaging device 102. The imaging device 102 also stores a private key 216A corresponding to the public key contained in the digital certificate 214A.

In embodiments, the digital certificate 214A is an X.509 certificate signed by a manufacturer of the imaging device 102. The digital certificate 214A is another type of digital certificate in other embodiments. The digital certificate 214A is signed by a certificate authority other than the manufacturer of the imaging device 102 in some embodiments.

The certificate signing request 208A includes additional data in embodiments. For instance, in some embodiments, the certificate signing request 208A includes parameters 212A defined by a manufacturer of the imaging device 102. In some embodiments, the certificate signing request 208A also includes a fully qualified domain name ("FQDN") 210A specified by the user 200 for the imaging device 102. The certificate signing request 208A includes the configuration parameters 206A returned from the IAM service 110 in the manner described above with regard to FIG. 2A in other embodiments.

In response to receiving the certificate signing request 208A, the IAM service 110 signs the digital certificate 214A with its own private key to generate a signed certificate 108A. The IAM service 110 returns the signed certificate 108A to the imaging device 102. In embodiments, the IAM service 110 also adds the digital certificate 214A to an allow list. The allow list includes digital certificates for devices that are permitted to connect to the IAM service 110.

In embodiments, the IAM service 110 also adds data defining a security policy 216 to the signed certificate 108A. As discussed above, the security policy 216 defines the computing devices, such as the computing device 106, that are authorized to utilize the imaging functionality (e.g., printing or scanning) provided by the imaging device 102.

The security policy 216 defines the users that are authorized to utilize the imaging functionality provided by the imaging device 102, in embodiments. The security policy 216 specifies limitations on usage of the imaging functionality provided by the imaging device 102, in some embodiments. The security policy 216 defines other types of policies in some embodiments.

As shown in FIG. 2B, the IAM service 110 also adds the parameters 212A, the FQDN 210A, and the configuration parameters 206A to the signed certificate 108A, according to embodiments. The imaging device 102 stores the signed certificate 108A received from the IAM service 110 in a local memory.

Figure 2C:
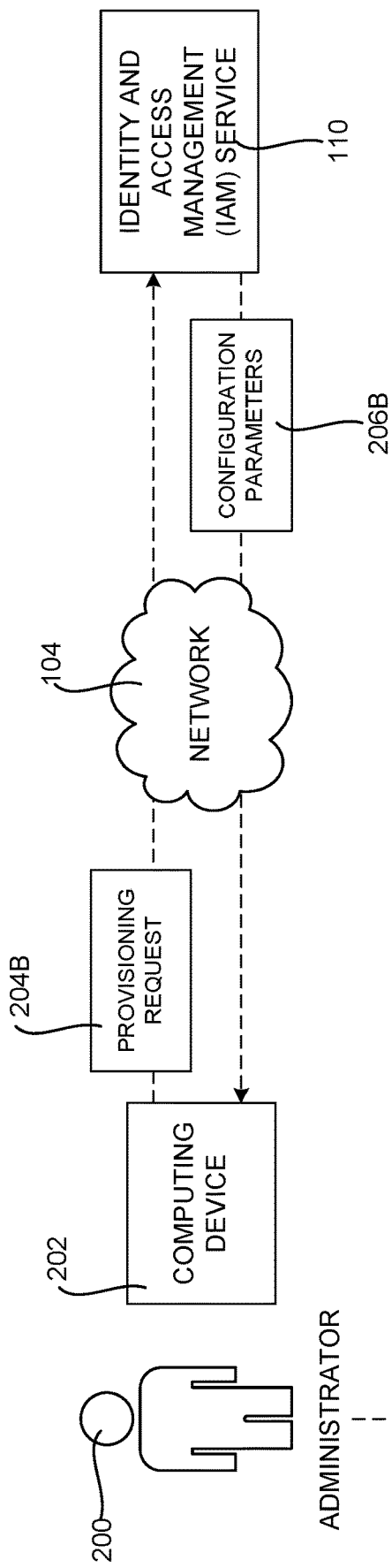
FIG. 2C is a network architecture diagram showing additional aspects of the mechanism shown in FIGS. 1A-1C, 2A, and 2B for configuring a computing device for communication with an IAM service, according to embodiments.

FIG. 2C is a network architecture diagram showing additional aspects of the mechanism shown in FIG. 1A for configuring a computing device 106 for communication with the IAM service 110, according to embodiments. In the embodiment shown in FIG. 2C, a user 200, such as a system administrator, utilizes a computing device 202 to establish a connection with the IAM service 110 over a suitable network 104, such as the internet. The user 200 utilizes the computing device 202 and an interface (e.g., a web-based interface) provided by the IAM service 110 to submit a provisioning request 204B to the IAM service 110.

The provisioning request 204B is a request to provision the computing device 106 for use with the IAM service 110. The provisioning request 204B includes data identifying the computing device 106. The provisioning request 204B includes other types of data for use by the IAM service 110 when provisioning the computing device 106, in some embodiments.

Responsive to the provisioning request 204B, the IAM service 110 enables the computing device 106 for use with the functionality provided by the IAM service 110. In some embodiments, the IAM service 110 also returns configuration parameters 206B to the computing device 202 in response to the provisioning request 204B.

The configuration parameters 206B include values for various parameters supported by the computing device 106. For instance, the configuration parameters 206B specify encryption algorithms supported by the IAM service 110, in some embodiments. The configuration parameters 206B are values for settings that enable the computing device 106 to connect to the IAM service 110, in other embodiments. In some embodiments, the configuration parameters 206B are values for other settings that enable the computing device 106 to interoperate with the IAM service 110.

In embodiments, the user 200 manually applies the configuration parameters 206B to the computing device 106. For instance, the user 200 utilizes a menu provided by the computing device 106 to configure the computing device 106 with the configuration parameters 206B provided by the IAM service 110, in some embodiments. In other embodiments, the computing device 106 itself retrieves the configuration parameters 206B from the IAM service 110 over the network 104. The computing device 106 is configured for communication with the IAM service 110 following application of the configuration parameters 206B.

Figure 2D:
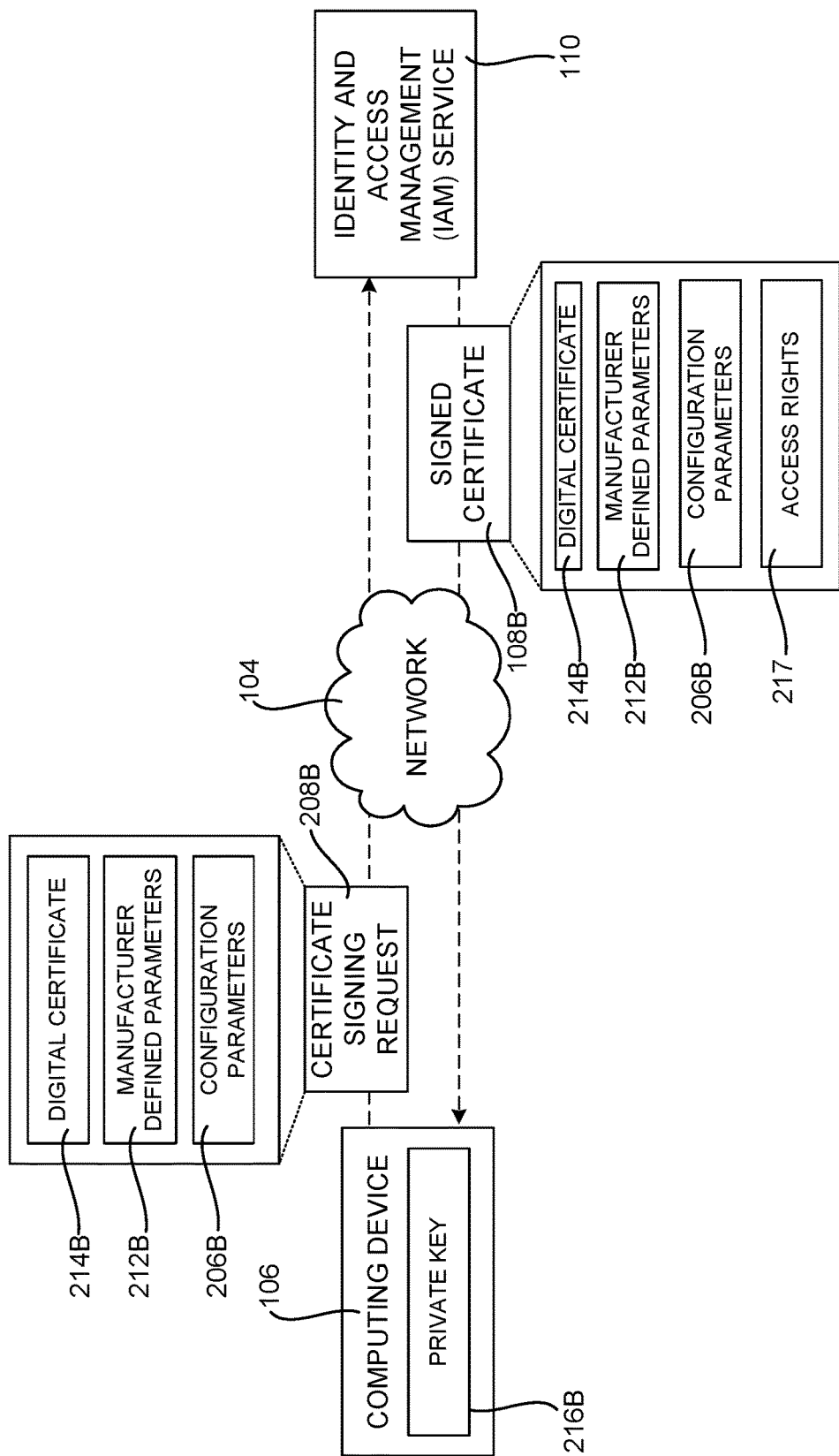
FIG. 2D is a network architecture diagram showing additional aspects of the mechanism shown in FIGS. 1A-1C and 2A-2C for obtaining a signed certificate for a computing device from an IAM service, according to embodiments.

FIG. 2D is a network architecture diagram showing additional aspects of the mechanism described briefly above with reference to FIG. 1A for obtaining a signed certificate 108B from the IAM service 110 for the computing device 106, according to embodiments. Once the computing device 106 has been provisioned in the IAM service 110 and configured for communication with the IAM service 110 in the manner described above with regard to FIG. 2C, the computing device 106 transmits a certificate signing request 208B to the IAM service 110.

As with the imaging device 102, the computing device 106 generates or is provisioned with a digital certificate 214B containing a public key associated with the computing device 106, in embodiments. The computing device 106 also stores a private key 216B corresponding to the public key set forth in the digital certificate 214B.

In some embodiment, the digital certificate 214B is an X.509 certificate signed by a manufacturer of the computing device 106. The digital certificate 214B is another type of digital certificate in other embodiments. The digital certificate 214B is signed by certificate authority other than the manufacturer of the computing device 106, in some embodiments.

The certificate signing request 208B includes the digital certificate 214B. The certificate signing request 208B includes additional data in some embodiments. For instance, in some embodiments, the certificate signing request 208B includes parameters 212B defined by a manufacturer of the computing device 106. The certificate signing request 208B includes the configuration parameters 206B returned from the IAM service 110 in some embodiments. The certificate signing request 208B includes other types of data in some embodiments.

In response to receiving the certificate signing request 208B, the IAM service 110 signs the digital certificate 214B with its own private key to generate a signed certificate 108B for the computing device 106. The IAM service 110 returns the signed certificate 108B to the computing device 106 in response to the certificate signing request 208B.

In embodiments, the IAM service 110 adds data defining access rights 217 for accessing the imaging functionality provided by the imaging device 102 to the signed certificate 108B. The access rights 217 specify that the computing device 106 or a user of the computing device 106 is authorized to utilize aspects of the imaging functionality provided by the imaging device 102. For instance, in some embodiments, the access rights 217 indicate membership in a security group for the computing device or a user of the computing device.

The access rights 217 specify other types of rights such as, for example, limitations on usage of the functionality provided by the imaging device 102, in some embodiments. The access rights 217 define other types of permissions or restrictions on the use of the imaging device 102 in additional embodiments. The computing device 106 receives the signed certificate 108B from the IAM service 110 and stores the signed certificate 108B in a local memory.

As discussed briefly above, the imaging device 102 obtains the signed certificate 108A from the IAM service 110 when a network connection to the IAM service 110 is active, such as by way of the network 104. Similarly, the computing device 106 obtains the signed certificate 108B from the IAM service 110 when a network connection to the IAM service 110 is active, such as by way of the network 104. As will be described in greater detail below, the imaging device 102 can utilize the signed certificates 108A and 108B to authenticate a user or computing device 106 to utilize the imaging functionality that it provides when a network connection to the IAM service 110 is not active, such as when a network connection is unavailable or when a network connection is available but is considered insecure.

Figure 2E:
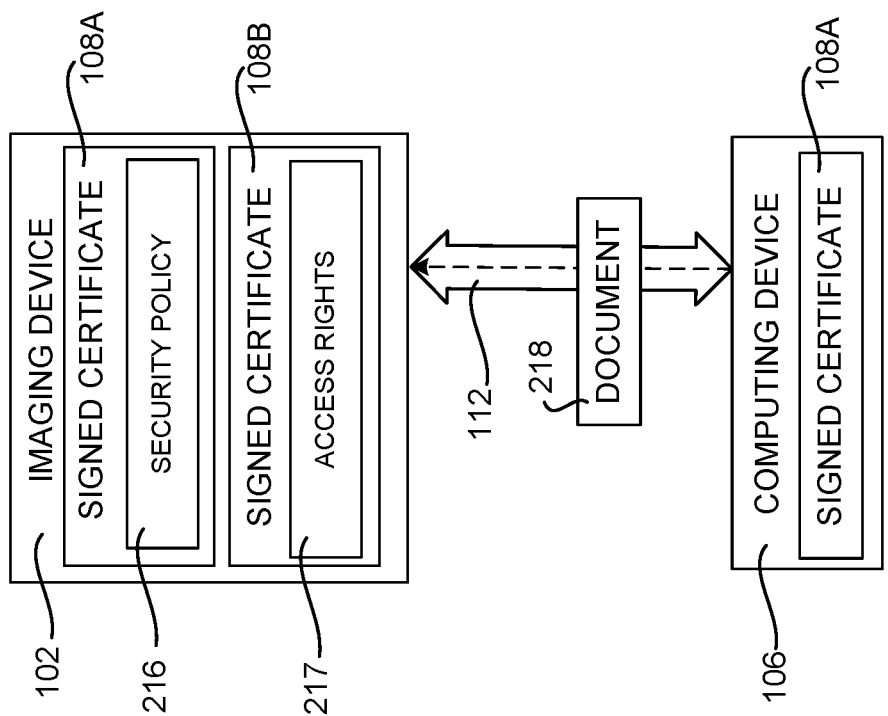
FIG. 2E is a network architecture diagram showing aspects of an example mechanism disclosed herein for performing a certificate exchange between an imaging device and a computing device and enabling imaging operations via a direct secure wireless connection to an imaging device based on the certificate exchange.

FIG. 2E is a network architecture diagram showing aspects of an example mechanism disclosed herein for performing a certificate exchange between the imaging device 102 and the computing device 106. FIG. 2E also shows aspects of an illustrative mechanism disclosed herein for enabling imaging operations via a direct secure wireless communication channel 112 to the imaging device 102 based on the certificate exchange, according to embodiments. In the embodiment illustrated in FIG. 2E, the imaging device 102 utilizes the signed certificates 108A and 108B to authenticate the computing device 106 to utilize the imaging functionality that it provides when a network connection to the IAM service 110 is not active.

As discussed briefly above, the imaging device 102 advertises its availability to computing devices, such as the computing device 106, by way of a wireless communication channel, in some embodiments. The computing device 106 utilizes other mechanisms to identify and initiate communication with the imaging device 102, in other embodiments.

In some embodiments, the imaging device 102 advertises its availability via a BLUETOOTH® wireless communication channel. In other embodiments, the imaging device 102 advertises its availability via a WI-FI® wireless communication channel. The imaging device 102 advertises its availability via other types of wireless communication channels (e.g., a near-field communication ("NFC") channel), in other embodiments.

In other embodiments, the imaging device 102 advertises its availability via a UWB wireless communication channel. As discussed above, a UWB wireless communication channel is a very low energy, short-range, high-bandwidth communication channel that utilizes a large portion of the radio spectrum. Computing devices equipped with the U1 chip from APPLE INC.® are examples of computing devices capable of communicating via a UWB wireless communication channel. Other devices from other manufacturers are similarly equipped with hardware capable of communicating via a UWB wireless communication channel.

In response to the advertisement of availability presented by the imaging device 102, the computing device 106 transmits a request to utilize aspects of the imaging functionality provided by the imaging device 102. For example, the computing device 106 transmits a request to utilize printing or scanning functionality provided by the imaging device 102, in some embodiments.

In response to receiving such a request, the imaging device 102 and the computing device 106 exchange the signed certificates 108A and 108B obtained from the IAM service 110, respectively. The certificate exchange is performed over a direct secure wireless communication channel 112, such as a UWB communication channel between the imaging device 102 and the computing device 106, in some embodiments.

In embodiments, the certificate exchange described above is performed during establishment of the direct secure wireless communication channel 112. For instance, the certificate exchange is performed over a UWB communication channel during establishment of the UWB communication channel, in some embodiments.

In other embodiments, the certificate exchange is performed prior to establishment of the direct secure wireless communication channel 112. For instance, the certificate exchange is performed over a BLUETOOTH® or WI-FIR) communication channel prior to establishing a UWB communication channel between the imaging device 102 and the computing device 106, in some embodiments.

The imaging device 102 authenticates the signed certificate 108B using the public key contained therein. The computing device 106 also authenticates the signed certificate 108A using the public key contained therein. If either of the signed certificates 108A and 108B cannot be authenticated, then a secure connection cannot be established between the imaging device 102 and the computing device 106.

If the signed certificates 108A and 108B are authenticated, the imaging device 102 utilizes the security policy 216 in the signed certificate 108A and the access rights 217 specified by the signed certificate 108B received from the computing device 106 to determine whether to authorize the computing device 106, or a user of the computing device 106, to utilize the requested imaging functionality. For example, the imaging device 102 determines if the security policy 216 indicates that a user or computing device 106 identified by the access rights 217 in the signed certificate 108B is authorized to use the requested functionality, in embodiments.

Based upon the comparison between the security policy 216 and the access rights 217, the imaging device 102 permits or denies the computing device 106 the ability to utilize the requested imaging functionality by way of the direct secure wireless communication channel 112. For instance, if the imaging device 102 determines that the computing device 106 is authorized to use requested functionality for printing, the computing device 106 transmits a document 218 to the imaging device 102 for printing by way of the direct secure wireless communication channel 112 (e.g., UWB communication channel). The computing device 106 utilizes other types of imaging functionality provided by an imaging device 102, such as scanning or faxing, in a similar manner.

Figure 3A:
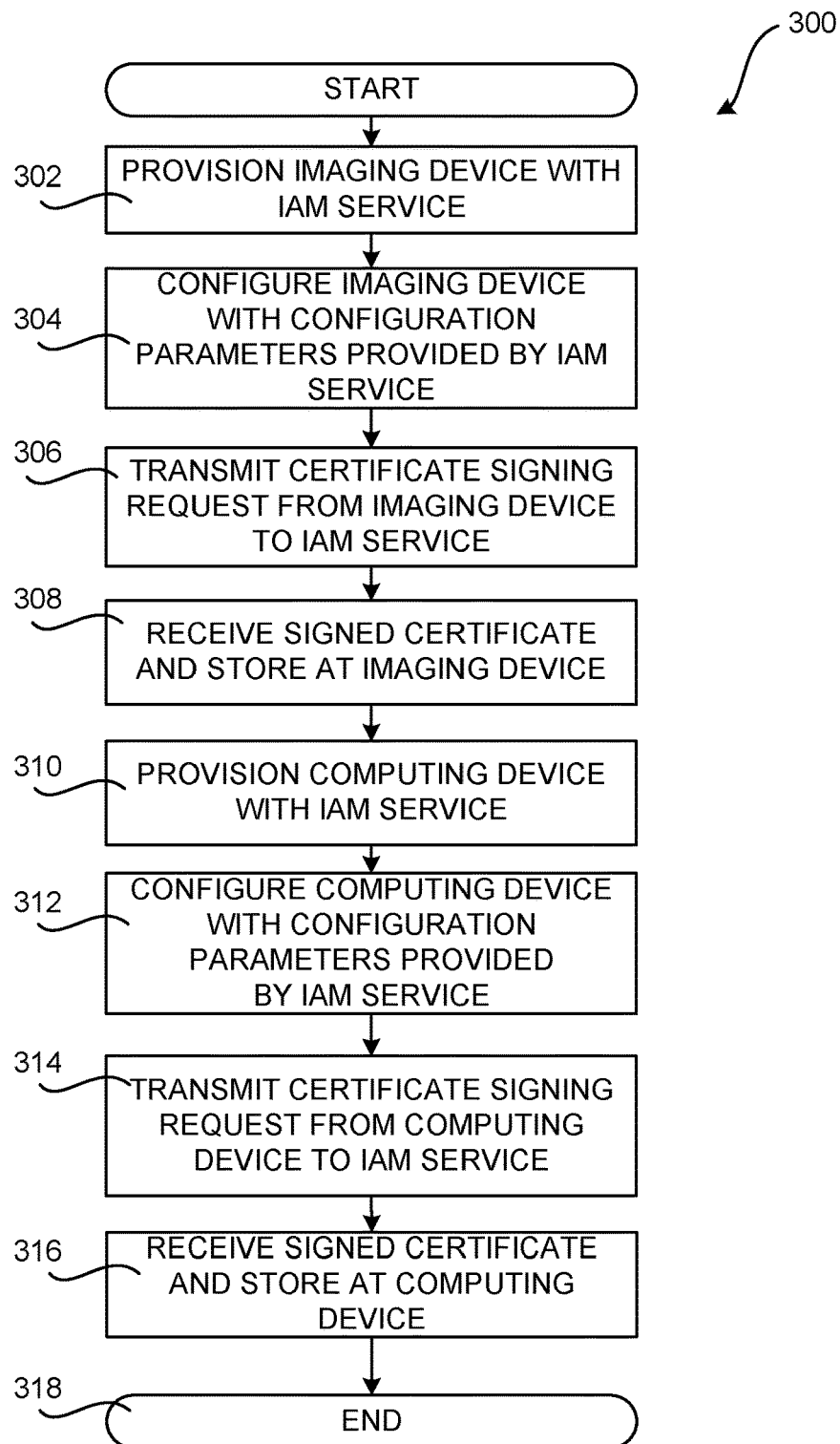
FIG. 3A is a flow diagram showing a routine that illustrates aspects of the example mechanism shown in FIGS. 1A-2E for provisioning and configuring an imaging device and a computing device for enabling the performance of imaging operations via a direct secure wireless connection to the imaging device, according to embodiments.

FIG. 3A is a flow diagram showing a routine 300 that illustrates aspects of the example mechanism shown in FIGS. 1A-2E for provisioning and configuring an imaging device 102 and a computing device 106 for enabling the performance of imaging operations via a direct secure wireless communication channel 112 between the imaging device 102 and the computing device 106, according to embodiments. As discussed above, the routine 300 is performed when the imaging device 102 and the computing device 106 can establish network connections to the IAM service 110.

The routine 300 begins at operation 302, where the imaging device 102 is provisioned with the IAM service 110. An embodiment of an illustrative mechanism for provisioning the imaging device 102 with the IAM service 110 was described above with reference to FIG. 2A. From operation 302, the routine 300 proceeds to operation 304.

At operation 304, the imaging device 102 is configured with the configuration parameters 206A provided by the IAM service 110 in response to the provisioning request 204A. Once the configuration parameters 206A have been applied to the imaging device 102, the imaging device 102 is configured for communication with the IAM service 110.

From operation 304, the routine 300 proceeds to operation 306, where the imaging device 102 transmits a certificate signing request 208A to the IAM service 110. The IAM service 110 receives the certificate signing request 208A and returns a signed certificate 108A to the imaging device 102.

At operation 308, the imaging device 102 receives the signed certificate 108A and stores the signed certificate 108A in a local memory. Details regarding illustrative contents of the certificate signing request 208A and the signed certificate 108A were provided above with respect to FIG. 2B.

From operation 308, the routine 300 proceeds to operation 310, where the computing device 106 is provisioned with the IAM service 110. An embodiment of an illustrative mechanism for provisioning the computing device 106 with the IAM service 110 was described above with reference to FIG. 2C. From operation 310, the routine 300 proceeds to operation 312.

At operation 312, the computing device 106 is configured with the configuration parameters 206B provided by the IAM service 110 in response to the provisioning request 204B. Once the configuration parameters 206B have been applied to the computing device 106, the computing device 106 is configured for communication with the IAM service 110.

From operation 312, the routine 300 proceeds to operation 314, where the computing device 106 transmits a certificate signing request 208B to the IAM service 110. The IAM service 110 receives the certificate signing request 208B and returns a signed certificate 108B to the computing device 106.

At operation 316, the computing device 106 receives the signed certificate 108B and stores the signed certificate 108B in a local memory, in embodiments. Details regarding illustrative contents of the certificate signing request 208B and the signed certificate 108B were provided above with respect to FIG. 2D.

Figure 3B:
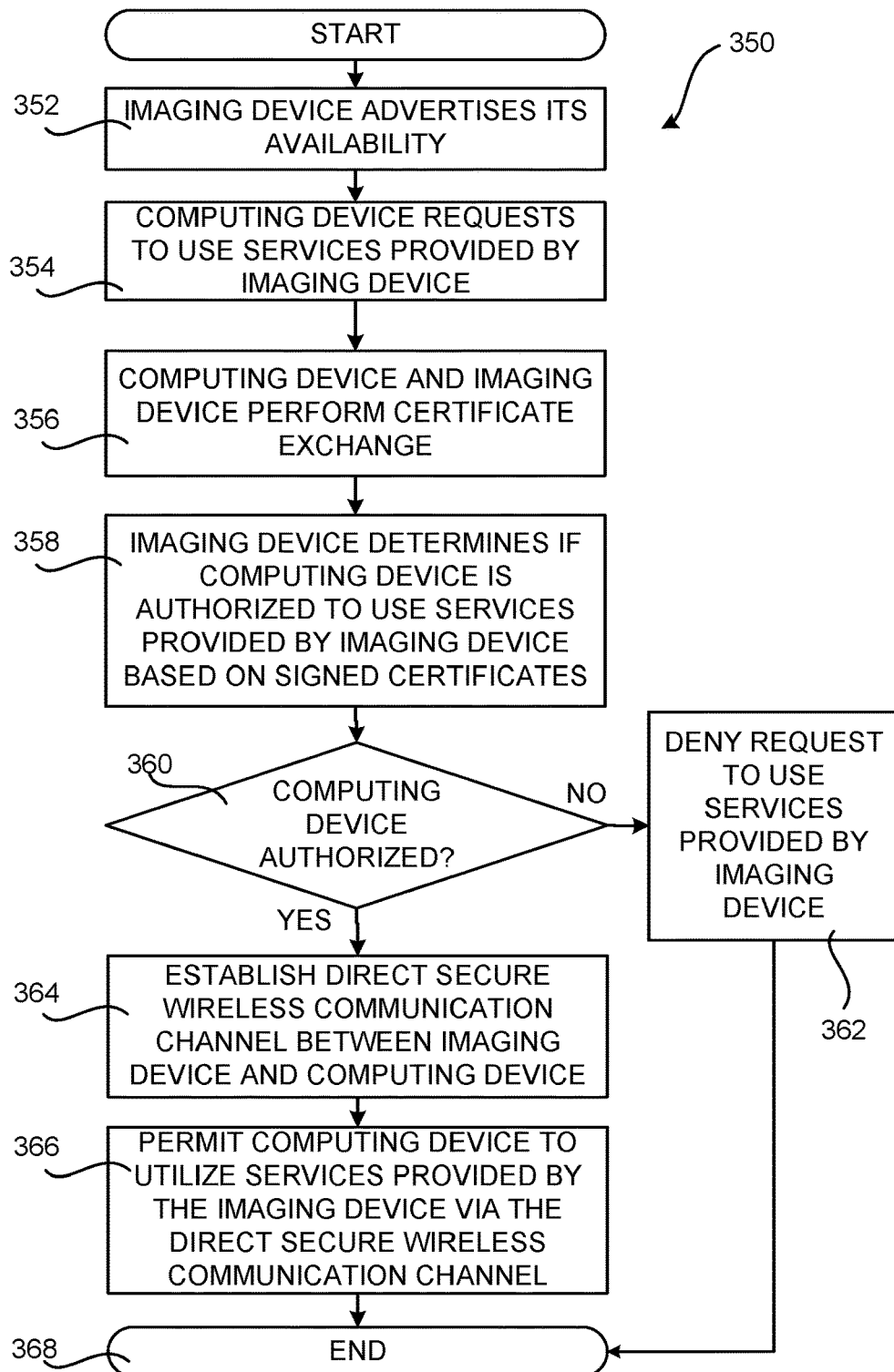
FIG. 3B is a flow diagram showing a routine that illustrates aspects of the example mechanism shown in FIGS. 1A-2E and 3A for authenticating a computing device to utilize imaging services provided by an imaging device via a direct secure wireless connection to the imaging device, according to embodiments.

FIG. 3B is a flow diagram showing a routine 350 that illustrates aspects of the example mechanism shown in FIGS. 1A-2E and 3A for authenticating a computing device 106 to utilize imaging services provided by an imaging device 102 via a direct secure wireless communication channel 112 to the imaging device 102. As discussed above, the routine 350 is performed when the imaging device 102 or the computing device 106 do not have an active network connection to the IAM service 110.

The routine 350 begins at operation 352, where the imaging device 102 advertises its availability to computing devices, such as the computing device 106, by way of a wireless communication channel, in embodiments. As discussed above, the imaging device 102 advertises its availability via a BLUETOOTH® wireless communication channel, in some embodiments. In other embodiments, the imaging device 102 advertises its availability via a UWB wireless communication channel. The imaging device 102 advertises its availability via other types of wireless communication channels in other embodiments. Other mechanisms for discovery are utilized in other embodiments.

From operation 352, the routine 350 proceeds to operation 354, where the computing device 106 transmits a request to utilize aspects of the imaging functionality provided by the imaging device 102. For example, the computing device 106 requests to utilize printing or scanning functionality provided by the imaging device 102, in embodiments.

From operation 354, the routine 350 proceeds to operation 356, where the imaging device 102 and the computing device 106 exchange the signed certificates 108A and 108B in the manner described above with respect to FIG. 2E, respectively. The certificate exchange is performed over the direct secure wireless communication channel 112, in embodiments. As discussed above, the direct secure wireless communication channel 112 is a UWB communication channel between the imaging device 102 and the computing device 106, in some embodiments.

From operation 356, the routine 350 proceeds to operation 358, where the imaging device 102 authenticates the signed certificate 108B. If the signed certificate 108B can be properly authenticated, the imaging device 102 utilizes the security policy 216 in the signed certificate 108A and the access rights 217 specified by the signed certificate 108B to determine whether to authorize the computing device 106 to utilize the requested imaging functionality by way of the direct secure wireless communication channel 112. For example, the imaging device 102 determines if the security policy 216 indicates that the computing device 106 is identified by the access rights 217 in the signed certificate 108B and is authorized to use the functionality requested by the computing device 106, in embodiments.

If the imaging device 102 determines that the computing device 106 is not permitted to utilize the requested imaging functionality, the routine 350 proceeds to operation 362, where the imaging device 102 transmits a response to the computing device 106 indicating that the request to utilize the imaging services provided by the imaging device 102 has been denied. The routine 350 then proceeds from operation 362 to operation 368, where it ends.

If, at operation 360, the imaging device 102 determines that the computing device 106 is permitted to utilize the requested imaging functionality, the routine 350 proceeds from operation 360 to operation 364, where the direct secure wireless communication channel 112 is established between the imaging device 102 and the computing device 106. As discussed above, the direct secure wireless communication channel 112 is a UWB communication channel between the imaging device 102 and the computing device 106, in embodiments.

From operation 364, the routine 350 proceeds to operation 366, where the imaging device 102 permits the computing device 106 to utilize the requested imaging functionality by way of the direct secure wireless communication channel 112, in embodiments. For instance, if the imaging device 102 permits the computing device 106 to use aspects of its functionality for printing, the computing device 106 transmits a document 218 to the imaging device 102 for printing by way of the direct secure wireless communication channel 112 (e.g., UWB communication channel). The routine 350 then proceeds from operation 366 to operation 368, where it ends.

Figure 4:
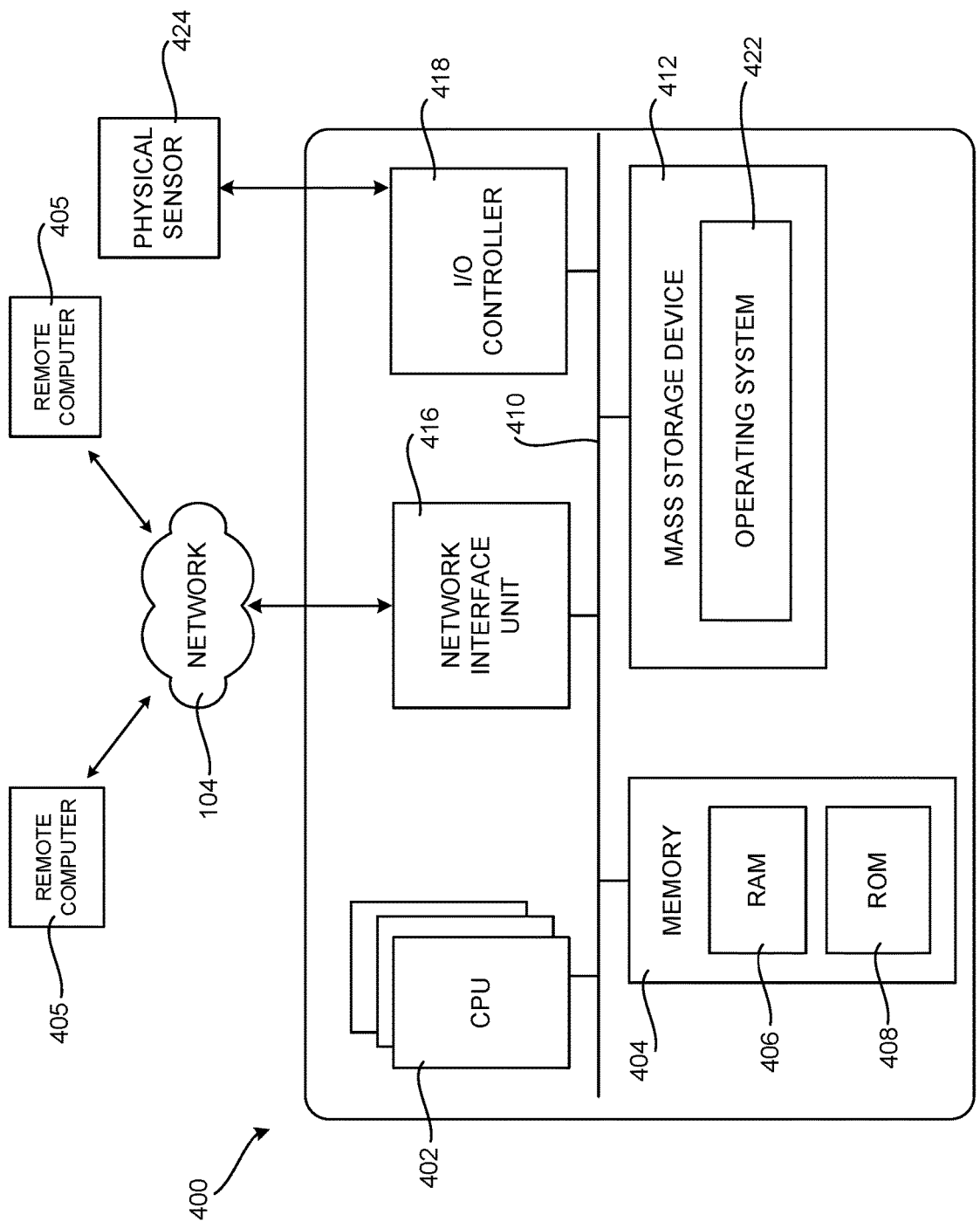
FIG. 4 is a computer architecture diagram showing an illustrative computer hardware and software architecture for a processing system that implements aspects of the technologies presented herein.

FIG. 4 is a computer architecture diagram showing an illustrative computer hardware and software architecture for a system 400 that implements the various technologies presented herein, according to embodiments. In particular, the architecture illustrated in FIG. 4 is utilized to implement aspects of an imaging device 102 or a computing device 106 capable of providing aspects of the functionality disclosed herein. In this regard, it is to be appreciated that in embodiments where the illustrated architecture is utilized to provide processing capability for an imaging device 102, the illustrated architecture includes one or more other components not shown in FIG. 4, such as a print engine, a scanner, a fax engine, or other components utilized for performing imaging operations.

The system 400 illustrated in FIG. 4 includes a processing system 402 including a central processing unit ("CPU"), a system memory 404, including a random-access memory 406 ("RAM") and a read-only memory ("ROM") 408, and a system bus 410 that couples the system memory 404 to the processing system 402. A firmware (not shown in FIG. 4) containing the basic routines that help to transfer information between elements within the system 400, such as during startup, is stored in the ROM 408, in embodiments.

The system 400 further includes a mass storage device 412 for storing an operating system 422, application programs, and other types of programs, some of which have been described herein. The mass storage device 412 is also configured to store other types of programs and data, in other embodiments.

The mass storage device 412 is connected to the CPU 402 through a mass storage controller (not shown in FIG. 4) connected to the bus 410. The mass storage device 412 and its associated computer readable media provide non-volatile storage for the system 400. Although the description of computer readable media contained herein refers to a mass storage device, such as a hard disk, Compact Disk Read-Only Memory ("CD-ROM") drive, Digital Versatile Disc-Read Only Memory ("DVD-ROM") drive, or Universal Serial Bus ("USB") storage key, computer readable media is any available computer-readable storage media or communication media that is accessible by the system 400.

Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, communication media includes wired media such as a wired network or direct-wired connection, and wireless media such as acoustic, radio frequency, infrared and other wireless media. Combinations of the any of the above are also included within the scope of computer-readable media.

By way of example, computer-readable storage media includes volatile and non-volatile, removable and non-removable media implemented in any method or technology for storage of information such as computer readable instructions, data structures, program modules or other data. For example, computer-readable storage media includes RAM, ROM, erasable programmable ROM ("EPROM"), electrically EPROM ("EEPROM"), flash memory or other solid-state memory technology, CD-ROM, DVD-ROM, HD-DVD, BLU-RAY®, or other optical storage, magnetic cassettes, magnetic tape, magnetic disk storage or other magnetic storage devices, or any other medium that stores the desired information and which is accessible to the system 400. For purposes of the claims, the phrase "computer-readable storage medium," and variations thereof, does not include waves or signals per se or communication media.

According to various configurations, the system 400 operates in a networked environment using logical connections to remote computers 405 through a network such as the network 104. The system 400 connects to the network 104 through a network interface unit 416 connected to the bus 410. The network interface unit 416 is utilized to connect to other types of networks and remote computer systems, in some embodiments.

The system 400 also includes an input/output controller 418 for receiving and processing input from a number of other devices, including a keyboard, mouse, touch input, an electronic stylus (none of which are shown in FIG. 4), or a physical sensor 424, such as a video camera. Similarly, the input/output controller 418 provides output to a display screen or other type of output device (also not shown in FIG. 4), in embodiments.

The software components described herein, when loaded into the processing system 402 and executed, transform the processing system 402 and the overall system 400 from a general-purpose computing device into a special-purpose processing system customized to facilitate the functionality presented herein. The processing system 402 is constructed from transistors or other discrete circuit elements, which individually or collectively assume any number of states, in embodiments.

More specifically, the processing system 402 operates as a finite-state machine, in response to executable instructions contained within the software modules disclosed herein, in embodiments. These computer-executable instructions transform the processing system 402 by specifying how the processing system 402 transitions between states, thereby transforming the transistors or other discrete hardware elements constituting the processing system 402.

Encoding the software modules presented herein also transforms the physical structure of the computer readable media presented herein. The specific transformation of physical structure depends on various factors, in different implementations of this description. Examples of such factors include, the technology used to implement the computer readable media, whether the computer readable media is characterized as primary or secondary storage, and the like.

For example, if the computer readable media is implemented as semiconductor-based memory, the software disclosed herein is encoded on the computer readable media by transforming the physical state of the semiconductor memory. For instance, the software transforms the state of transistors, capacitors, or other discrete circuit elements constituting the semiconductor memory. The software transforms the physical state of such components in order to store data thereupon.

As another example, the computer readable media disclosed herein is implemented using magnetic or optical technology, in embodiments. In such implementations, the program components presented herein transform the physical state of magnetic or optical media, when the software is encoded therein. These transformations include altering the magnetic characteristics of particular locations within given magnetic media. These transformations also include altering the physical features or characteristics of particular locations within given optical media, to change the optical characteristics of those locations. Other transformations of physical media are possible without departing from the scope and spirit of the present description, with the foregoing examples provided only to facilitate this discussion.

It is to be appreciated that the architecture shown in FIG. 4 for the processing system 400, or a similar architecture, is suitable for implementing other types of computing devices, including hand-held computers, video game devices, embedded computer systems, mobile devices such as smartphones, tablets, alternate reality ("AR"), mixed reality ("MR"), and virtual reality ("VR") devices, and other types of computing devices known to those skilled in the art. It is also contemplated that the processing system 400 might not include all of the components shown in FIG. 4, include other components that are not explicitly shown in FIG. 4, or an utilize an architecture completely different than that shown in FIG. 4, according to embodiments.

Figure 5:
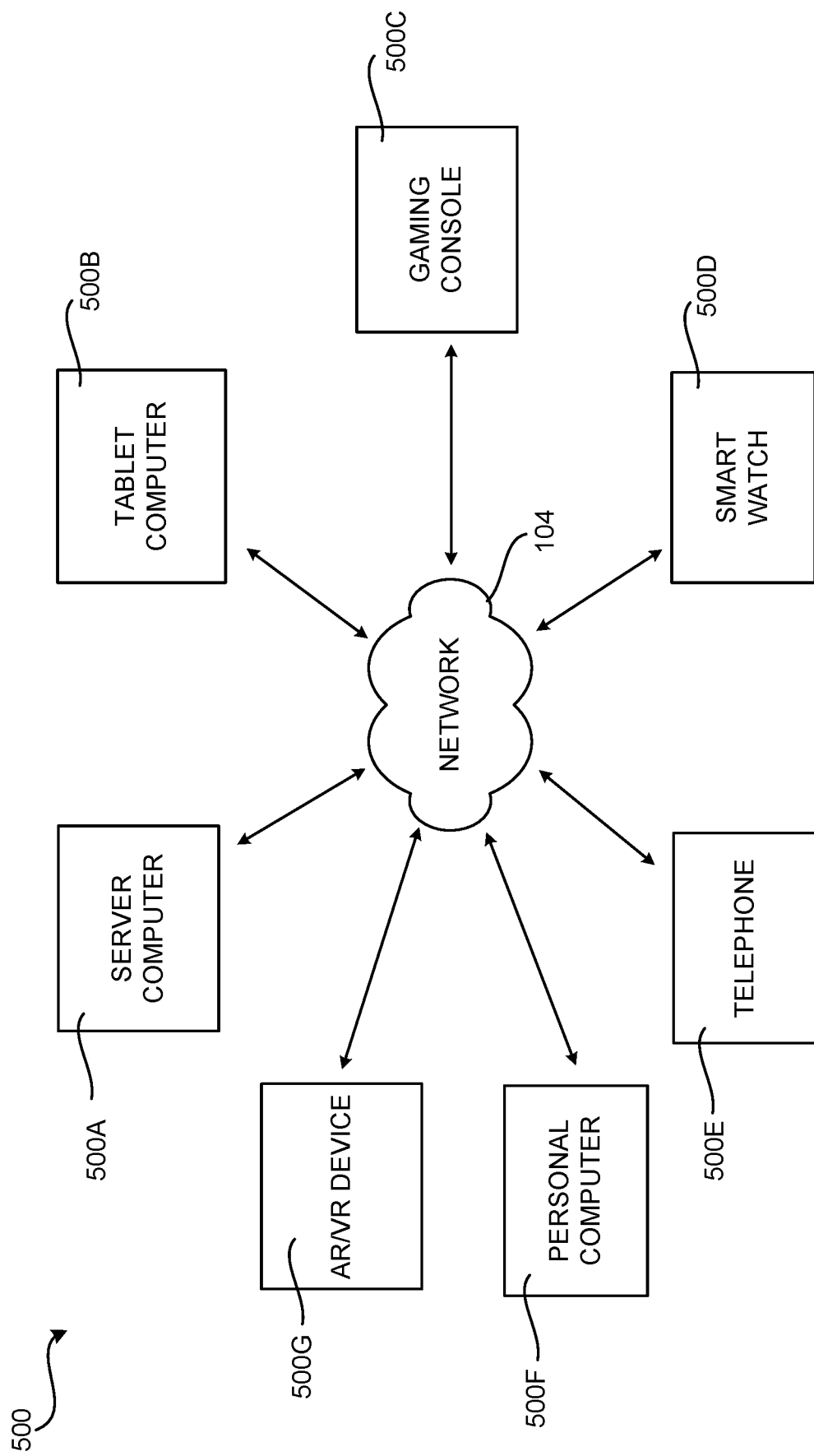
FIG. 5 is a network diagram illustrating an example distributed computing environment in which aspects of the disclosed technologies are implemented.

FIG. 5 is a network diagram illustrating a distributed network computing environment 500 in which aspects of the disclosed technologies are implemented, according to various embodiments presented herein. As shown in FIG. 5, one or more server computers 500A are interconnected via a network 104 (which might be any of, or a combination of, a fixed-wire or WLAN, wide-area network ("WAN"), intranet, extranet, peer-to-peer network, VPN, the internet, Bluetooth® communication network, proprietary low voltage communication network, or other communication network) with a number of client computing devices such as a tablet computer 500B, a gaming console 500C, a smart watch 500D, a telephone 500E, such as a smartphone, a personal computer 500F, and an AR/VR device 500G.

In a network environment in which the network 104 is the internet, for example, the server computer 500A is a dedicated server computer operable to process and communicate data to and from the client computing devices 500B-500G via any of a number of known protocols, such as, hypertext transfer protocol ("HTTP"), file transfer protocol ("FTP"), or simple object access protocol ("SOAP").

Additionally, the network computing environment 500 utilizes various data security protocols such as secured socket layer ("SSL") or pretty good privacy ("PGP"), in embodiments. Each of the client computing devices 500B-500G is equipped with an OS, such as the OS 422, operable to support one or more computing applications or terminal sessions such as a web browser (not shown in FIG. 5), graphical UI (not shown in FIG. 5), or a mobile desktop environment (not shown in FIG. 5) to gain access to the server computer 500A, in embodiments.

The server computer 500A is communicatively coupled to other computing environments (not shown in FIG. 5) and receives data regarding a participating user's interactions, in embodiments. In an illustrative operation, a user (not shown in FIG. 5) interacts with a computing application running on a client computing device 500B-500G to obtain desired data and/or perform other computing applications.

The data and/or computing applications are stored on the server 500A, or servers 500A, and communicated to cooperating users through the client computing devices 500B-500G over the network 104, in embodiments. A participating user (not shown in FIG. 5) requests access to specific data and applications housed in whole or in part on the server computer 500A. These data are communicated between the client computing devices 500B-500G and the server computer 500A for processing and storage.

The server computer 500A hosts computing applications, processes and applets for the generation, authentication, encryption, and communication of data and applications such as those described above with regard to FIGS. 1A-4, and cooperates with other server computing environments (not shown in FIG. 5), third party service providers (not shown in FIG. 5), and network attached storage ("NAS") and storage area networks ("SAN") (also not shown in FIG. 5) to realize application/data transactions, in embodiments.

The computing architecture shown in FIG. 4 and the distributed network computing environment shown in FIG. 5 have been simplified for ease of discussion. The computing architecture and the distributed computing network include and utilize many more computing components, devices, software programs, networking devices, and other components not specifically described herein, in various embodiments. Those skilled in the art will also appreciate that the subject matter described herein might be practiced with other computer system configurations other than those shown in FIGS. 4 and 5, including hand-held devices, multiprocessor systems, microprocessor-based or programmable consumer electronics, computing or processing systems embedded in devices (such as wearable computing devices, automobiles, home automation, etc.), minicomputers, mainframe computers, and the like.

It is to be further understood that the operations of the routines and methods disclosed herein are not presented in any particular order and that performance of some or all of the operations in an alternative order, or orders, is possible and is contemplated. The operations have been presented in the demonstrated order for ease of description and illustration. Operations might be added, omitted, and/or performed simultaneously, without departing from the scope of the appended claims. The illustrated routines and methods might end at any time and need not be performed in their entireties.

Some or all operations of the methods, and/or substantially equivalent operations, are performed by execution of computer-readable instructions included on a computer-readable storage media, as defined herein, in embodiments. The term "computer-readable instructions," and variants thereof, as used herein, is used expansively herein to include routines, applications, application modules, program modules, programs, program components, data structures, algorithms, and the like. Computer-readable instructions are implemented on various system configurations, including single-processor or multiprocessor systems, minicomputers, mainframe computers, personal computers, hand-held computing devices, microprocessor-based, programmable consumer electronics, combinations thereof, and the like.

The logical operations described herein are implemented (1) as a sequence of computer implemented acts or program modules running on a computing system and/or (2) as interconnected machine logic circuits or circuit modules within the computing system, according to embodiments. The implementation is a matter of choice dependent on the performance and other requirements of the computing system. Accordingly, the logical operations described herein are referred to variously as states, operations, structural devices, acts, or modules. These operations, structural devices, acts, and modules are implemented in software, in firmware, in special purpose digital logic, and any combination thereof, according to embodiments.

For example, the operations illustrated in the sequence and flow diagrams and described herein are implemented in embodiments, at least in part, by modules implementing the features disclosed herein such as a dynamically linked library ("DLL"), a statically linked library, functionality produced by an API, a network service, a compiled program, an interpreted program, a script or any other executable set of instructions. Data is stored in a data structure in one or more memory components. Data is retrieved from the data structure by addressing links or references to the data structure.

The methods and routines described herein might be also implemented in many other ways. For example, the routines and methods are implemented, at least in part, by a processor of another remote computer or a local circuit, in embodiments. In addition, one or more of the operations of the routines or methods are alternatively or additionally implemented, at least in part, by a chipset working alone or in conjunction with other software modules, in embodiments.

The disclosure presented herein also encompasses the subject matter set forth in the following clauses:

Clause 1. A computer-implemented method, comprising storing a first signed certificate at an imaging device, the first signed certificate comprising a security policy for accessing functionality provided by the imaging device: receiving a second signed certificate from the computing device at the imaging device, the second signed certificate comprising access rights for accessing the functionality provided by the imaging device: determining, at the imaging device, to authorize the computing device to utilize the functionality provided by the imaging device by way of a direct secure wireless communication channel between the imaging device and the computing device based on the security policy and the access rights; and based on the determining, permitting the computing device to utilize the functionality provided by the imaging device by way of the direct secure wireless communication channel.

Clause 2. The computer-implemented method of clause 1, further comprising establishing the direct secure wireless communication channel between the imaging device and the computing device, wherein the second signed certificate is received at the imaging device during establishment of the direct secure wireless communication channel.

Clause 3. The computer-implemented method of any of clauses 1 or 2, further comprising establishing the direct secure wireless communication channel between the imaging device and the computing device, wherein the second signed certificate is received at the imaging device prior to establishing the direct secure wireless communication channel.

Clause 4. The computer-implemented method of any of clauses 1-3, wherein the first signed certificate further comprises a public key associated with the imaging device, and wherein the first signed certificate is signed by an identity and access management (IAM) service.

Clause 5. The computer-implemented method of any of clauses 1-4, wherein the second signed certificate further comprises a public key associated with the computing device, and wherein the second signed certificate is signed by an identity and access management (IAM) service.

Clause 6. The computer-implemented method of any of clauses 1-5, wherein the first signed certificate is stored at the imaging device when a first network connection between the imaging device and an identity and access management (IAM) service is active, wherein the second signed certificate is stored at the computing device when a second network connection between the imaging device and the IAM service is active, and wherein the second signed certificate is received from the computing device at the imaging device when the first network connection or the second network connection are not active.

Clause 7. The computer-implemented method of any of clauses 1-6, wherein the imaging device is configured to report usage and status information to a management service when an active network connection to the management service is present.

Clause 8. A computer-readable storage medium having computer-executable instructions stored thereupon which, when executed by an imaging device, cause the imaging device to: receive a request from a computing device at an imaging device to access the functionality provided by the imaging device, the request comprising a first signed certificate that defines access rights for the computing device to access the functionality provided by the imaging device: responsive to the request, determine, at the imaging device, to authorize the computing device to utilize the functionality provided by the imaging device by way of a direct secure wireless communication channel between the imaging device and the computing device based the access rights and a security policy contained in a second signed certificate received from the computing device; and based on the determining, permit the computing device to utilize the functionality provided by the imaging device by way of the direct secure wireless communication channel.

Clause 9. The computer-readable storage medium of clause 8, having further computer-executable instructions stored thereupon to obtain the first signed certificate at the imaging device during establishment of the direct secure wireless communication channel.

Clause 10. The computer-readable storage medium of any of clauses 8 or 9, having further computer-executable instructions stored thereupon to obtain the first signed certificate at the imaging device prior to establishing the direct secure wireless communication channel.

Clause 11. The computer-readable storage medium of any of clauses 8-10, wherein the second signed certificate further comprises a public key associated with the imaging device, and wherein the first signed certificate is signed by an identity and access management (IAM) service.

Clause 12. The computer-readable storage medium of any of clauses 8-11, wherein the first signed certificate further comprises a public key associated with the computing device, and wherein the second signed certificate is signed by an identity and access management (IAM) service.

Clause 13. The computer-readable storage medium of any of clauses 8-12, wherein the second signed certificate is obtained when the imaging device has an active network connection to an identity and access management (IAM) service, wherein the first signed certificate is obtained when the computing device has an active network connection to the IAM service, and wherein the first signed certificate is received from the computing device at the imaging device when the imaging device or the computing device do not have an active network connection to the IAM service.

Clause 14. The computer-readable storage medium of any of clauses 8-13, wherein the direct secure wireless connection comprises an ultra-wideband wireless connection between the imaging device and the computing device.

Clause 15. A system, comprising: a processing system comprising a processor; and a computer-readable storage medium having computer-executable instructions stored thereupon that, when executed by the processing system, cause the system to: obtain a first signed certificate defining a security policy for accessing functionality provided by an imaging device: obtain a second signed certificate defining access rights for a computing device to access the functionality provided by the imaging device: receive a request from the computing device at the imaging device to access the functionality provided by the imaging device: responsive to the request, determine, at the imaging device, whether to authorize the computing device to utilize the functionality provided by the imaging device by way of a direct secure wireless communication channel between the imaging device and the computing device based on the security policy and the access rights; and based on the determining, permit the computing device to utilize the functionality provided by the imaging device by way of the direct secure wireless communication channel.

Clause 16. The processing system of clause 15, wherein the direct secure wireless connection comprises an ultra-wideband wireless connection between the imaging device and the computing device.

Clause 17. The processing system of any of clauses 15 or 16, wherein the computer-readable storage medium has further computer-executable instructions stored thereupon to obtain the second signed certificate at the imaging device during establishment of the direct secure wireless communication channel.

Clause 18. The processing system of any of clauses 15-17, wherein the computer-readable storage medium has further computer-executable instructions stored thereupon to obtain the second signed certificate at the imaging device prior to establishing the direct secure wireless communication channel.

Clause 19. The processing system of any of clauses 15-18, wherein the first signed certificate and the second signed certificate are signed by an identity and access management (IAM) service.

Clause 20. The processing system of any of clauses 15-19, wherein the computer-readable storage medium has further computer-executable instructions stored thereupon to report usage and status information to a management service when no active network connection from the imaging device to a management service is present.

Technologies for performing imaging operations via a direct secure wireless connection to an imaging device have been disclosed herein. Although the subject matter presented herein has been described in language specific to computer structural features, methodological and transformative acts, specific computing machinery, and computer readable media, it is to be understood that the subject matter set forth in the appended claims is not limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes might be made to the subject matter described herein without following the example configurations and applications illustrated and described, and without departing from the scope of the present disclosure, which is set forth in the following claims.

What is claimed is:

1. A computer-implemented method, comprising:
   storing a first signed certificate at an imaging device, the first signed certificate comprising a security policy for accessing functionality provided by the imaging device;
   receiving a second signed certificate from the computing device at the imaging device, the second signed certificate comprising access rights for accessing the functionality provided by the imaging device;
   determining, at the imaging device, to authorize the computing device to utilize the functionality provided by the imaging device by way of a direct secure wireless communication channel between the imaging device and the computing device based on the security policy and the access rights; and
   based on the determining, permitting the computing device to utilize the functionality provided by the imaging device by way of the direct secure wireless communication channel.

2. The computer-implemented method of claim 1, further comprising establishing the direct secure wireless communication channel between the imaging device and the computing device, wherein the second signed certificate is received at the imaging device during establishment of the direct secure wireless communication channel.

3. The computer-implemented method of claim 1, further comprising establishing the direct secure wireless communication channel between the imaging device and the computing device, wherein the second signed certificate is received at the imaging device prior to establishing the direct secure wireless communication channel.

4. The computer-implemented method of claim 1, wherein the first signed certificate further comprises a public key associated with the imaging device, and wherein the first signed certificate is signed by an identity and access management (IAM) service.

5. The computer-implemented method of claim 1, wherein the second signed certificate further comprises a public key associated with the computing device, and wherein the second signed certificate is signed by an identity and access management (IAM) service.

6. The computer-implemented method of claim 1, wherein the first signed certificate is stored at the imaging device when a first network connection between the imaging device and an identity and access management (IAM) service is active, wherein the second signed certificate is stored at the computing device when a second network connection between the imaging device and the IAM service is active, and wherein the second signed certificate is received from the computing device at the imaging device when the first network connection or the second network connection are not active.

7. The computer-implemented method of claim 1, wherein the imaging device is configured to report usage and status information to a management service when an active network connection to the management service is present.

8. A computer-readable storage medium having computer-executable instructions stored thereupon which, when executed by an imaging device, cause the imaging device to:
receive a request from a computing device at an imaging device to access the functionality provided by the imaging device, the request comprising a first signed certificate that defines access rights for the computing device to access the functionality provided by the imaging device;
responsive to the request, determine, at the imaging device, to authorize the computing device to utilize the functionality provided by the imaging device by way of a direct secure wireless communication channel between the imaging device and the computing device based the access rights and a security policy contained in a second signed certificate received from the computing device; and
based on the determining, permit the computing device to utilize the functionality provided by the imaging device by way of the direct secure wireless communication channel.

9. The computer-readable storage medium of claim 8, having further computer-executable instructions stored thereupon to obtain the first signed certificate at the imaging device during establishment of the direct secure wireless communication channel.

10. The computer-readable storage medium of claim 8, having further computer-executable instructions stored thereupon to obtain the first signed certificate at the imaging device prior to establishing the direct secure wireless communication channel.

11. The computer-readable storage medium of claim 8, wherein the second signed certificate further comprises a public key associated with the imaging device, and wherein the first signed certificate is signed by an identity and access management (IAM) service.

12. The computer-readable storage medium of claim 8, wherein the first signed certificate further comprises a public key associated with the computing device, and wherein the second signed certificate is signed by an identity and access management (IAM) service.

13. The computer-readable storage medium of claim 8, wherein the second signed certificate is obtained when the imaging device has an active network connection to an identity and access management (IAM) service, wherein the first signed certificate is obtained when the computing device has an active network connection to the IAM service, and wherein the first signed certificate is received from the computing device at the imaging device when the imaging device or the computing device do not have an active network connection to the IAM service.

14. The computer-readable storage medium of claim 8, wherein the direct secure wireless connection comprises an ultra-wideband wireless connection between the imaging device and the computing device.

15. A system, comprising:
a processing system comprising a processor; and
a computer-readable storage medium having computer-executable instructions stored thereupon that, when executed by the processing system, cause the system to:
obtain a first signed certificate defining a security policy for accessing functionality provided by an imaging device;
obtain a second signed certificate defining access rights for a computing device to access the functionality provided by the imaging device;
receive a request from the computing device at the imaging device to access the functionality provided by the imaging device;
responsive to the request, determine, at the imaging device, whether to authorize the computing device to utilize the functionality provided by the imaging device by way of a direct secure wireless communication channel between the imaging device and the computing device based on the security policy and the access rights; and
based on the determining, permit the computing device to utilize the functionality provided by the imaging device by way of the direct secure wireless communication channel.

16. The processing system of claim 15, wherein the direct secure wireless connection comprises an ultra-wideband wireless connection between the imaging device and the computing device.

17. The processing system of claim 16, wherein the computer-readable storage medium has further computer-executable instructions stored thereupon to obtain the second signed certificate at the imaging device during establishment of the direct secure wireless communication channel.

18. The processing system of claim 16, wherein the computer-readable storage medium has further computer-executable instructions stored thereupon to obtain the second signed certificate at the imaging device prior to establishing the direct secure wireless communication channel.

19. The processing system of claim 15, wherein the first signed certificate and the second signed certificate are signed by an identity and access management (IAM) service.

20. The processing system of claim 15, wherein the computer-readable storage medium has further computer-executable instructions stored thereupon to report usage and status information to a management service when no active network connection from the imaging device to a management service is present.

\* \* \* \* \*